United States Patent
Lyons et al.

(10) Patent No.: US 7,886,118 B2
(45) Date of Patent: Feb. 8, 2011

(54) DETECTING ILLEGAL REUSE OF MEMORY WITH LOW RESOURCE IMPACT

(75) Inventors: Michael E. Lyons, Round Rock, TX (US); Bruce Mealey, Austin, TX (US); Jonathan A. Wildstrom, Mount Vernon, NY (US)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 11/619,695

(22) Filed: Jan. 4, 2007

(65) Prior Publication Data

US 2008/0168112 A1    Jul. 10, 2008

(51) Int. Cl.
*G06F 12/00*    (2006.01)
*G06F 13/00*    (2006.01)
(52) U.S. Cl. .................. 711/159; 711/100; 711/154
(58) Field of Classification Search .............. 711/100, 711/154, 159; 707/206
See application file for complete search history.

(56) References Cited

U.S. PATENT DOCUMENTS 5,983,329 A * 11/1999 Thaler et al. ............. 711/163
6,970,991 B2 * 11/2005 Harman ..................... 711/206

* cited by examiner

*Primary Examiner*—Tuan V. Thai
(74) *Attorney, Agent, or Firm*—Dillon & Yudell LLP (57) ABSTRACT

A method, computer program product, and data processing system for preventing the occurrence of undetectable dangling pointers through memory reallocation are disclosed. Allocated memory regions that are no longer needed are deallocated but are not immediately freed for reallocation, being designated as "retained." A memory retention metric is computed as a measure of an extent of the retained memory regions in the computer's memory space. Once the memory retention metric exceeds a pre-determined threshold, some or all of the retained memory regions are freed for reuse. In this manner, improper accesses to deallocated memory regions can be detected more easily, since reuse of those regions is delayed, while at the same time excessive resource usage and heap fragmentation is avoided by only retaining deallocated regions for a limited time (determined by the threshold and retention metric chosen).

20 Claims, 6 Drawing Sheets

```
#include <stdlib.h>
include <string.h> main(int argc, char **argv) {
    char *a, *b;
                                                    ┌─ 102
    a = (char *)malloc(sizeof(int)*512);  /* Allocate a. */
    free(a);                              /* Free a. */
         └─ 104
    b = (char *)malloc(sizeof(int)*512);  /* Allocate b  *
                        └─ 106             * (over a's   *
                                           * previous    *
                                           * space).    */ strcpy(a,"This is a test.");  /* This is a bug */
    return 0;         └─ 108
}
```

DETECTING ILLEGAL REUSE OF MEMORY WITH LOW RESOURCE IMPACT

BACKGROUND OF THE INVENTION

1. Technical Field

The present invention relates generally to memory management in an operating system, and more specifically, to a memory management scheme that is adapted to address the problem of debugging dangling pointers.

2. Description of the Related Art

"Dangling pointers" (also referred to as "wild pointers") are some of the most common and devastating types of computer programming errors (bugs). A dangling pointer is a pointer or memory reference that does not point to a valid object of the appropriate type or, in certain languages, to a distinguished null pointer value (i.e., a null pointer value that does not correspond to any numerical memory address [e.g., JAVA null pointers], as opposed to non-distinguished null pointers, where a null pointer is a numerical address that is defined by convention [e.g., C's NULL pointer, by convention, has a numerical value of 0].). Dereferencing a dangling pointer in an application can corrupt not only that application's data, but the application program itself, as well as any other data, applications, memory-mapped input/output, or system software residing in memory, thus producing unpredictable and often quite bizarre results. Indeed, the unpredictable ("wild" in the sense of "erratic") behavior of a dangling (wild) pointer, which can depend on many factors outside of the program containing the error, also makes dangling pointers some of the most difficult errors to detect ("wild" in the sense of "difficult to contain"). A demonstrable malfunction may only occur under very particular circumstances, which may be extremely difficult to reliably reproduce.

Because these types of errors are so destructive and so common, most modern multitasking operating systems and the hardware platforms that support them provide some form of facility for "memory protection." Each application is allocated memory by the operating system and must access only those addresses in memory allocated to it. If a process attempts to access memory that is outside of the memory regions allocated to it, the illegal access attempt is detected by the operating system as an error (often called a "protection fault" or "segmentation fault") and the offending process is terminated before disaster occurs. The current processing state of the terminated process is usually saved to disk just prior to termination to allow for post mortem debugging to determine where in the program the fault occurred and why. This saving of the processing state is usually referred to as "dumping core," a throwback to the days when most computers used ferromagnetic core memory.

Memory protection can prevent many of the most potentially destructive dangling pointers from causing system crashes and is an important tool for a software developer in that it can alert the developer to potentially serious errors that might otherwise lie undetected until long after the software has been released.

Figure 1:
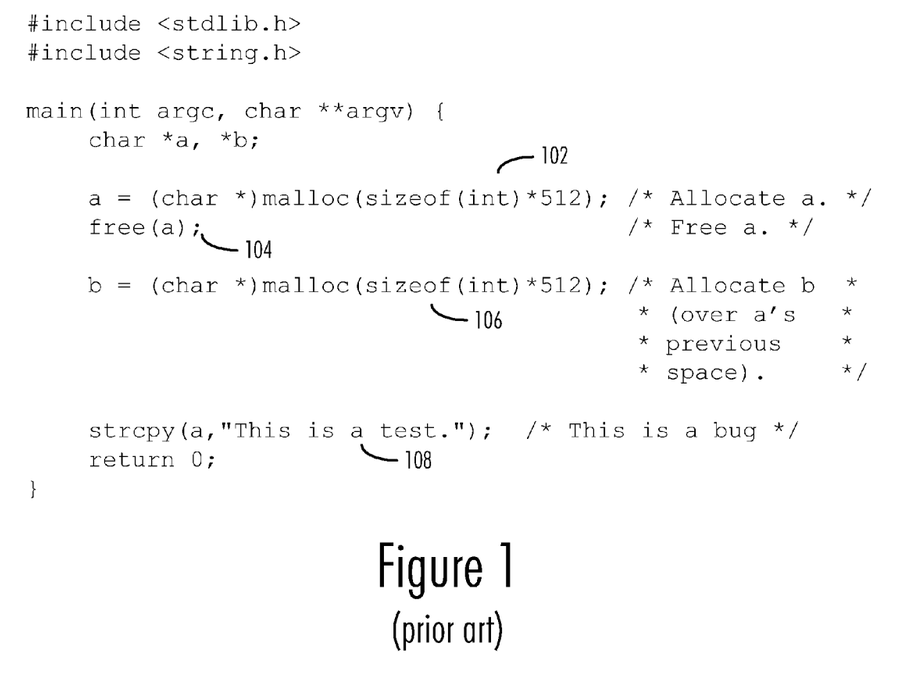
FIG. 1 is a diagram of a C program illustrating a potentially undetectable dangling pointer error.

While memory protection is highly useful in detecting dangling pointers, memory protection cannot detect all dangling pointers, however. In particular, memory protection typically cannot detect "internal corruption," where a process corrupts its own data with an invalid memory access. An example, in the C programming language, of "internal corruption" is provided in FIG. 1. Line 102 of FIG. 1 allocates a block of memory (using the C library function "malloc") and assigns the address of the allocated block to the pointer variable "a." Line 104 calls the C function "free" to deallocate the block pointed to by "a." Line 106 then allocates a new block of memory pointed to by a different pointer variable "b." For the purpose of this example, assume that this new block occupies the space previously allocated at line 102. The dangling pointer dereference occurs at line 108, where the stale pointer "a" is used to store a string to memory. Because the memory pointed to by "a" has been reallocated back to the same program, however, the improper memory access at line 108 will not trigger a protection fault.

What is needed, therefore, is a method for preventing undetectable internal corruption due to dangling pointers during the debugging phase of software development. The present invention provides a solution to this and other problems, and offers other advantages over previous solutions.

SUMMARY OF THE INVENTION

Accordingly, the present invention provides a method, computer program product, and data processing system for preventing the occurrence of undetectable dangling pointers through memory reallocation. Allocated memory regions that are no longer needed are deallocated but are not immediately freed for reallocation, being designated as "retained." A memory retention metric is computed as a measure of an extent of the retained memory regions in the computer's memory space. Once the memory retention metric exceeds a pre-determined threshold, some or all of the retained memory regions are freed for reuse. In this manner, improper accesses to deallocated memory regions can be detected more easily, since reuse of those regions is delayed, while at the same time excessive resource usage and heap fragmentation is avoided by only retaining deallocated regions for a limited time (determined by the threshold and retention metric chosen).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

The present invention is directed to the allocation, deallocation, and management of regions of memory in the memory space of a runtime environment. In a preferred embodiment, this memory management is performed by an operating system charged with the task of allocating memory for all of the application processes running in the operating system. Other runtime environments may also employ the teachings of the present invention, however. For example, some application processes, such as certain interpreters and virtual machines, may perform their own memory management in lieu of or in addition to that performed by the operating system and may therefore also be made to contain an embodiment the invention described herein.

A preferred embodiment of the present invention manages the allocation and deallocation of memory regions by assigning a status designation to each region of memory in the managed memory space. This designation classifies each region of memory as being "free," "allocated," or "retained." "Free" memory is memory that is not currently used by any process and that is available for allocation. Any attempt by a process to access "free" memory will trigger a protection fault, as the "free" memory has not been allocated to any process. "Allocated" memory has been assigned to one or more processes for use by the use of that/those process(es). Any process to which "allocated" memory has been assigned may access the "allocated" memory, but any access attempt by a process to which the "allocated" memory has not been assigned will trigger a protection fault. "Retained" is an intermediate status between "free" and "allocated." "Retained" memory is not allocated to any process (i.e., no process may access "retained" memory without triggering a protection fault). However, unlike "free" memory, "retained" memory is not available for reallocation.

In a preferred embodiment of the present invention, when an "allocated" region of memory is to be deallocated, because it is no longer needed by its assigned process, it does not immediately enter the "free" state. Instead, the deallocated memory region is designated as "retained." While the deallocated memory region is in the "retained" state, since it cannot be reallocated, any attempt to access a memory address in that memory region will be invalid and trigger a protection fault, thus alerting the user of the process triggering the protection fault that an error has occurred.

To ensure that the memory space does not become saturated with retained memory regions (which are essentially unusable), a preferred embodiment of the present invention computes a memory retention metric to determine the extent of retained memory regions in the memory space. When the metric exceeds a certain pre-determined threshold, some or all of the retained memory regions are redesignated as "free," thus allowing these memory regions to be reallocated. There are a number of different metrics that may be employed for this purpose. For example, the metric could be a count of the number of retained memory regions in the memory space. Alternatively, the metric could be a measure of the amount of memory (e.g., number of bytes) occupied by retained memory regions. In a preferred embodiment of the present invention, the memory space is organized into equally-sized pages, so these two metrics are equivalent.

Figure 2:
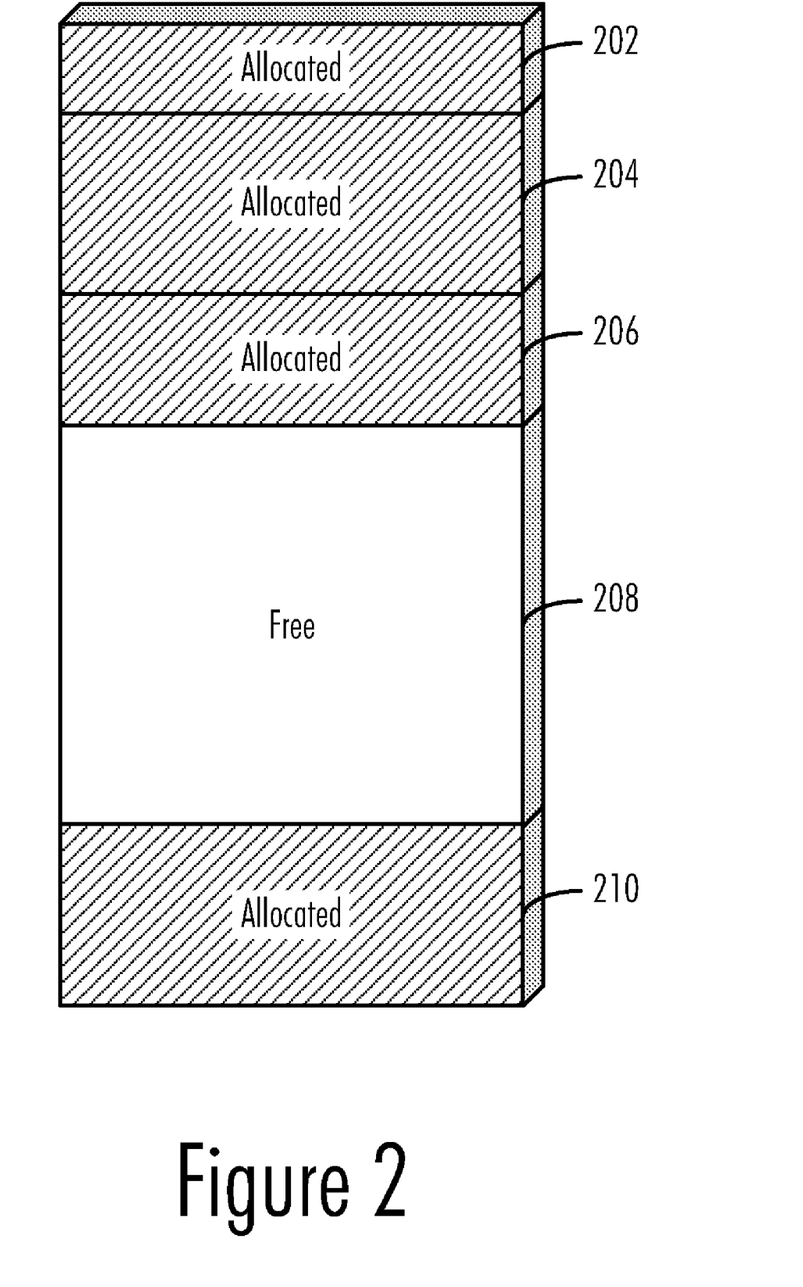
FIGS. 2-4 are diagrams of a memory space illustrating the management of that memory space in accordance with a preferred embodiment of the present invention.
Figure 3:
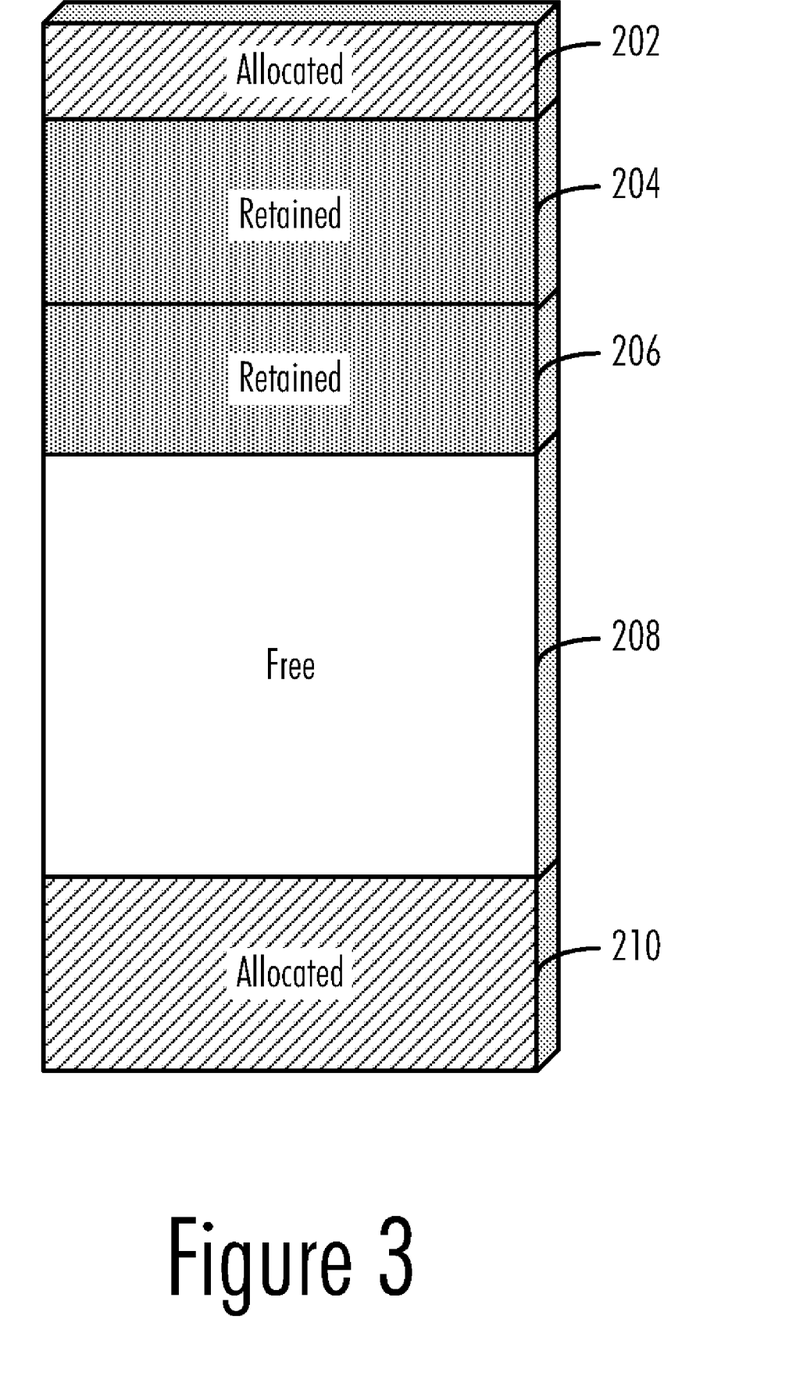

For example, in FIG. 2 a memory map of a managed memory space is depicted. Four regions of allocated memory (memory regions 202, 204, 206, and 210) are shown, as well as a region of free memory 208. If regions 204 and 206 are deallocated, because they are no longer needed, they will be designated as "retained," as shown in FIG. 3.

Figure 4:
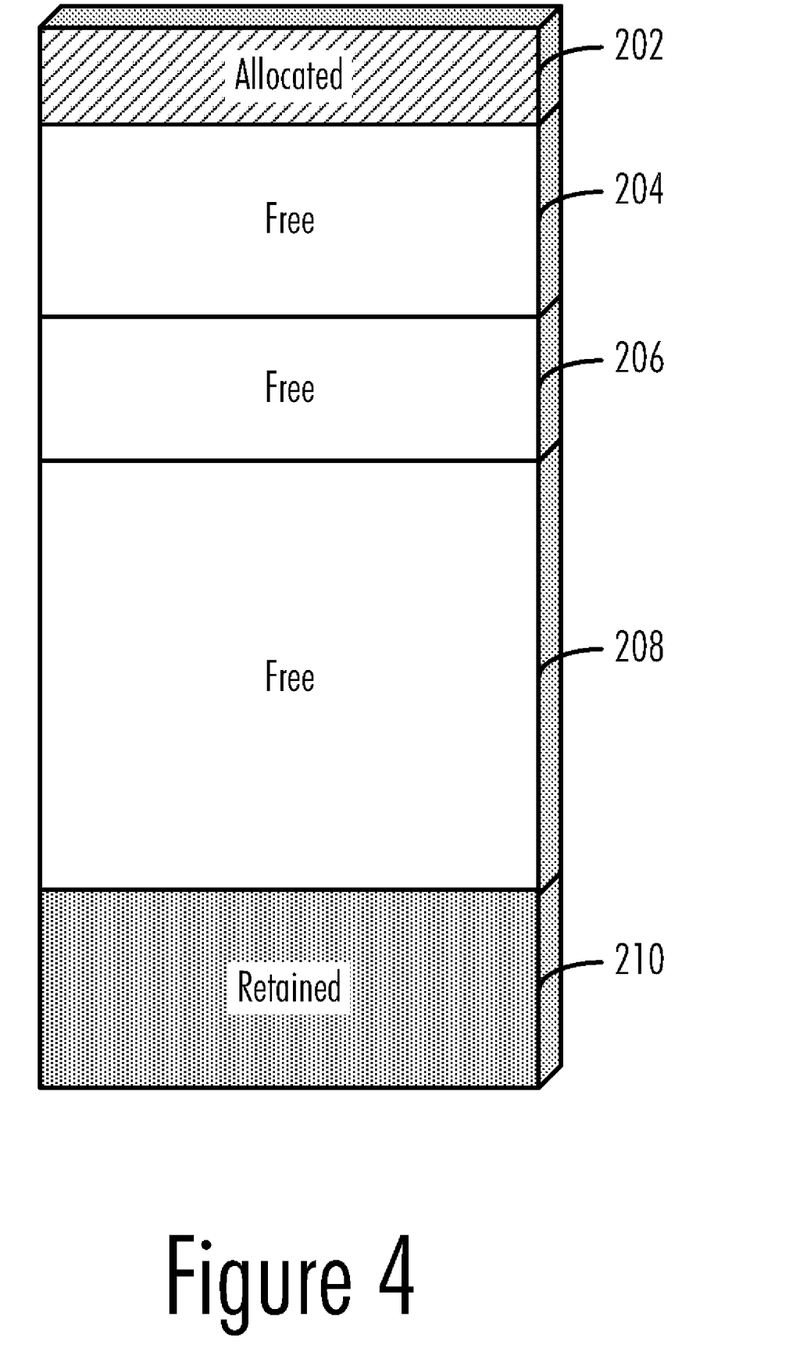

Now, suppose that the memory retention metric is the number of retained memory regions and the threshold value for this metric is two. In that case, if region 210 is deallocated and made "retained," the metric will exceed the threshold. Thus, to limit the number of retained memory regions, the existing retained memory regions (regions 204 and 206) are then designated free, while the newly deallocated region 210 is designated retained (shown in FIG. 4). At this point, the threshold is no longer exceeded, and newly deallocated region 210 will remain in the "retained" state for at least some period of time.

One skilled in the art will recognize that although in this example, all existing retained memory regions were made free once the threshold was exceeded, it is not essential that all existing retained memory regions be freed. For example, a pre-determined fraction of the memory regions may be freed instead. Alternatively, a minimum set of memory regions could be freed to allow the threshold to no longer be exceeded. Preferably, retained memory regions will be freed in an order such that the oldest or the least recently accessed memory region is freed first.

One skilled in the art will also recognize that it is advantageous to make the threshold a user-definable (or at least programmer-definable) parameter to allow a compromise between memory performance and debugging ability to be reached. It is also preferable to allow for the disabling the designation of retained memory regions altogether (by setting the threshold to "zero," for example), so as to achieve maximum memory performance at run-time.

Figure 5:
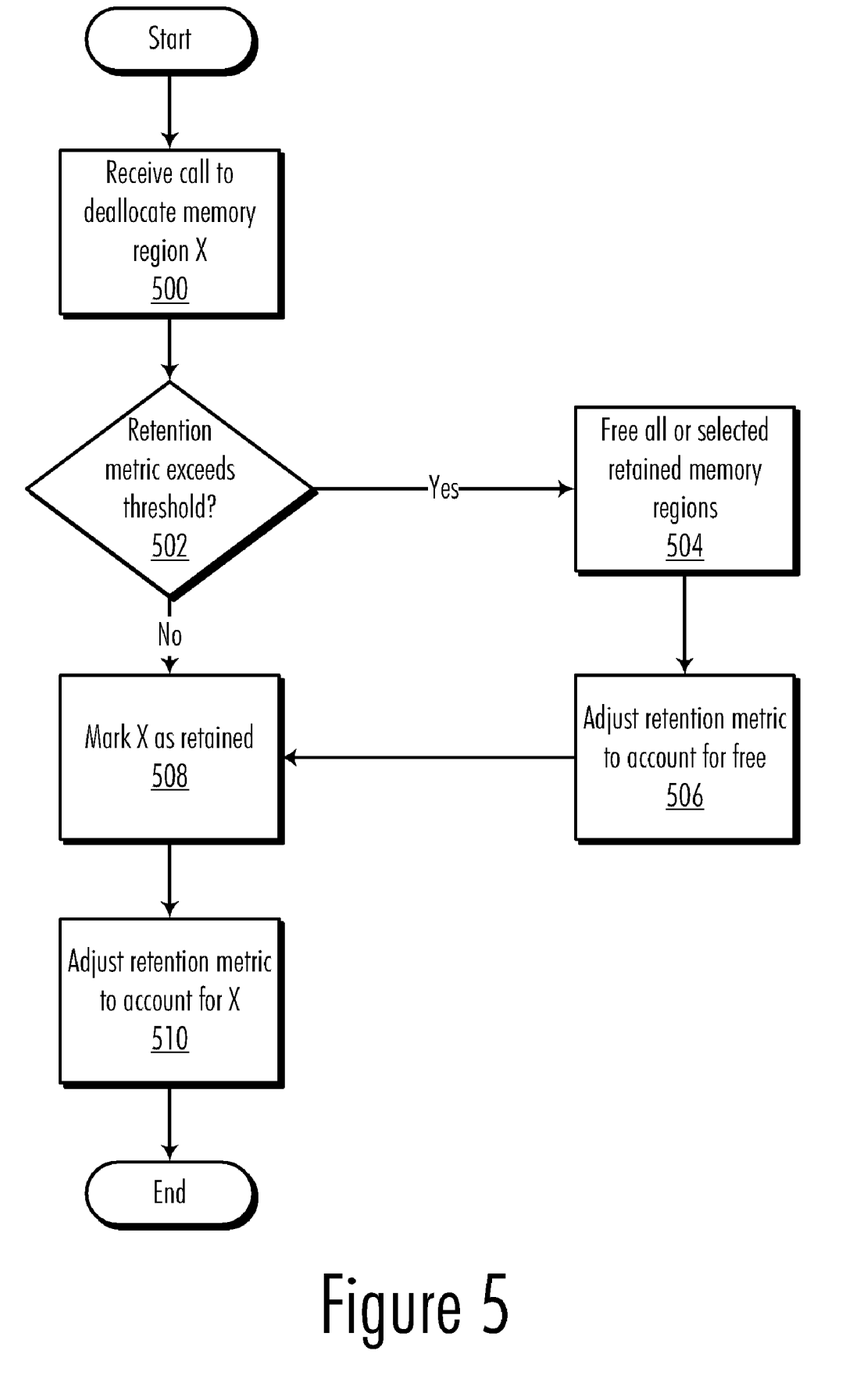
FIG. 5 is a flowchart representation of a process of deallocating a memory region in accordance with a preferred embodiment of the present invention.

FIG. 5 is a flowchart representation of a process of deallocating memory in accordance with a preferred embodiment of the present invention. Once a call (e.g., to the operating system or runtime library) is received to deallocate a memory region denoted here as memory region "X" (block 500), a determination is made as to whether the selected memory retention metric exceeds (or will exceed once memory region X is deallocated) the pre-determined threshold (block 502). If so (block 502:Yes), then some or all of the existing retained memory regions are redesignated as free (block 504) and the retention metric is adjusted to account for this redesignation (block 506). Following this adjustment (block 506) or if the retention metric was determined not to exceed the threshold (block 502:No), memory region X is designated as retained (block 508) and the retention metric is adjusted to account for the designation of X as retained (block 510).

Figure 6:
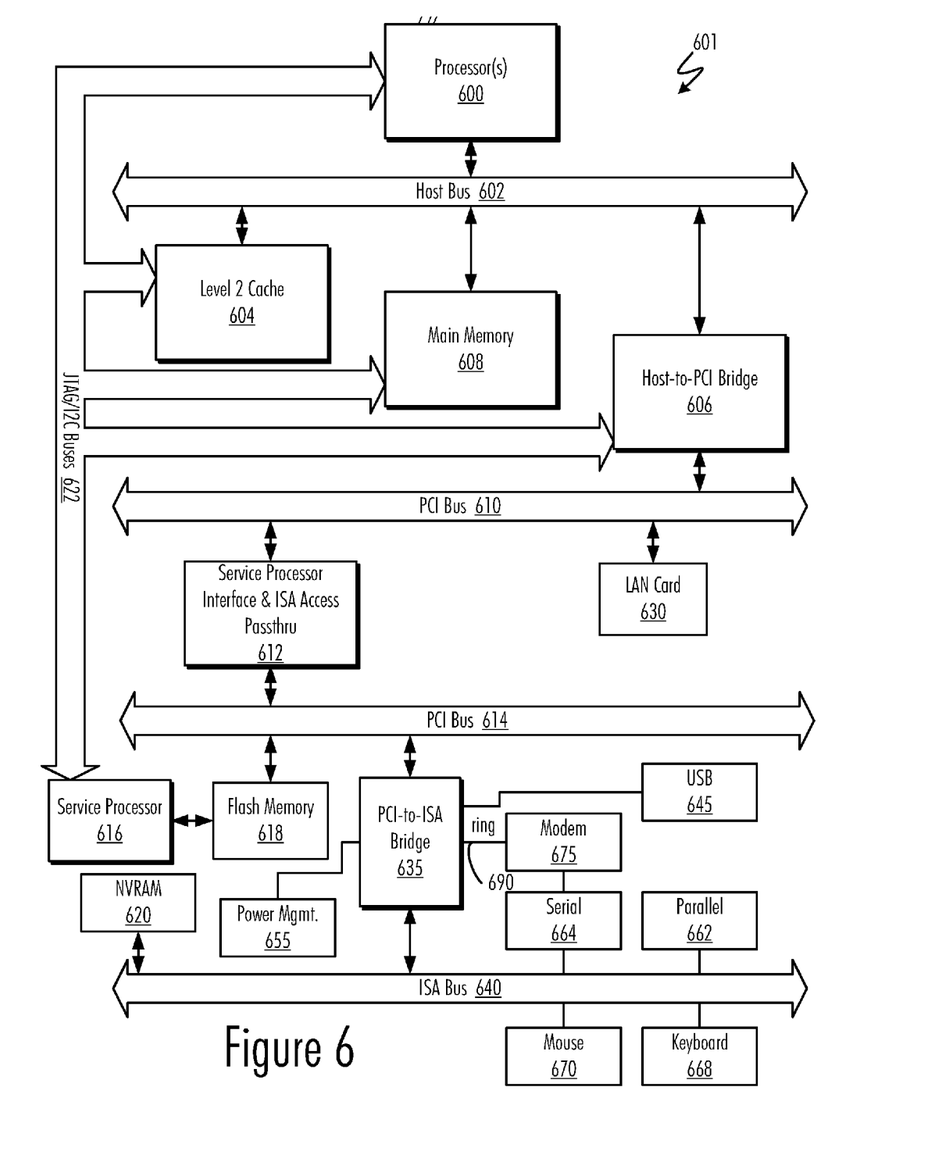
FIG. 6 is a block diagram of a data processing system in which a preferred embodiment of the present invention may be implemented.

FIG. 6 illustrates information handling system 601 which is a simplified example of a computer system/data processing system capable of performing the computing operations described herein with respect to a preferred embodiment of the present invention. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Passthrough 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C buses 622 for communication with processor(s) 600 during initialization steps. JTAG/I2C buses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. A computer-implemented method comprising:
designating one or more deallocated memory regions in a memory space as retained memory regions, wherein the deallocated memory regions may not be reallocated for as long as the deallocated memory regions continue to be designated as retained memory regions;
computing a memory region retention metric, wherein the memory region retention metric is related to existence of retained memory regions in the memory space;
determining if the memory region retention metric exceeds a pre-determined threshold, which defines one of an integer number retained memory regions or a size of memory occupied by the retained memory regions; and
in response to a determination that the memory region retention metric exceeds the pre-determined threshold, freeing selected retained memory regions, wherein the freeing causes said selected retained memory regions to no longer be designated as retained memory regions.

2. The method of claim 1, wherein the selected retained memory regions includes all retained memory regions in the memory space.

3. The method of claim 1, further comprising:
selecting said selected retained memory regions so that the freeing of said selected retained memory regions causes the memory region retention metric to no longer exceed the pre-determined threshold; and
wherein said selecting of retained memory regions to free is performed as one of: (a) first selecting a least recently access memory region, wherein retained memory regions are freed in an order in which they were retained; (b) selecting a minimum set of memory regions required to no longer exceed the threshold; (c) selecting a pre-determining fraction of the retained memory regions; and (d) selecting all retained memory regions.

4. The method of claim 1, wherein the memory region retention metric is related to how many retained memory regions exist in the memory space and the pre-determined threshold is a pre-determined integer number.

5. The method of claim 4, wherein:
the threshold is one of a user-definable or programmer-definable parameter to allow a compromise between memory performance and debugging ability; and
the threshold is set to zero when maximum memory performance is desired to be achieved at run-time.

6. The method of claim 1, wherein the memory region retention metric is related to an amount of memory contained in retained memory regions in the memory space and the pre-determined threshold is a pre-determined measure of an amount of memory.

7. The method of claim 1, wherein said designating takes place in response to a request to deallocate a memory region.

8. A computer program product stored on a computer-readable memory device comprising functional descriptive material that, when executed by a computer, causes the computer to perform actions that include:
   designating one or more deallocated memory regions in a memory space as retained memory regions, wherein the deallocated memory regions may not be reallocated for as long as the deallocated memory regions continue to be designated as retained memory regions;
   computing a memory region retention metric, wherein the memory region retention metric is related to existence of retained memory regions in the memory space;
   determining if the memory region retention metric exceeds a pre-determined threshold, which defines one of an integer number retained memory regions or a size of memory occupied by the retained memory regions; and
   in response to a determination that the memory region retention metric exceeds the pre-determined threshold, freeing selected retained memory regions, wherein the freeing causes said selected retained memory regions to no longer be designated as retained memory regions.

9. The computer program product of claim 8, wherein the selected retained memory regions include all retained memory regions in the memory space.

10. The computer program product of claim 8, comprising functional descriptive material that, when executed by a computer, causes the computer to perform additional actions of:
    selecting said selected retained memory regions so that the freeing of said selected retained memory regions causes the memory region retention metric to no longer exceed the pre-determined threshold; and
    wherein said selecting of retained memory regions to free is performed as one of: (a) first selecting a least recently access memory region, wherein retained memory regions are freed in an order in which they were retained; (b) selecting a minimum set of memory regions required to no longer exceed the threshold; (c) selecting a pre-determining fraction of the retained memory regions; and (d) selecting all retained memory regions.

11. The computer program product of claim 8, wherein the memory region retention metric is related to how many retained memory regions exist in the memory space and the pre-determined threshold is a pre-determined integer number.

12. The computer program product of claim 11, wherein:
    the threshold is one of a user-definable or programmer-definable parameter to allow a compromise between memory performance and debugging ability; and
    the threshold is set to zero when maximum memory performance is desired to be achieved at run-time.

13. The computer program product of claim 8, wherein the memory region retention metric is related to an amount of memory contained in retained memory regions in the memory space and the pre-determined threshold is a pre-determined measure of an amount of memory.

14. The computer program product of claim 8, wherein said designating takes place in response to a request to deallocate a memory region.

15. A data processing system comprising:
    at least one processor;
    data storage accessible to the at least one processor; and
    a set of instructions in the data storage, wherein the at least one processor executes the set of instructions to perform actions that include:
       designating one or more deallocated memory regions in a memory space as retained memory regions, wherein the deallocated memory regions may not be reallocated for as long as the deallocated memory regions continue to be designated as retained memory regions;
       computing a memory region retention metric, wherein the memory region retention metric is related to existence of retained memory regions in the memory space;
       determining if the memory region retention metric exceeds a pre-determined threshold, which defines one of an integer number retained memory regions or a size of memory occupied by the retained memory regions; and
       in response to a determination that the memory region retention metric exceeds the pre-determined threshold, freeing selected retained memory regions, wherein the freeing causes said selected retained memory regions to no longer be designated as retained memory regions.

16. The data processing system of claim 15, wherein the selected retained memory regions include all retained memory regions in the memory space.

17. The data processing system of claim 15, wherein the at least one processor executes the set of instructions to perform additional actions of:
    selecting said selected retained memory regions so that the freeing of said selected retained memory regions causes the memory region retention metric to no longer exceed the pre-determined threshold; and
    wherein said selecting of retained memory regions to free is performed as one of: (a) first selecting a least recently access memory region, wherein retained memory regions are freed in an order in which they were retained; (b) selecting a minimum set of memory regions required to no longer exceed the threshold; (c) selecting a pre-determining fraction of the retained memory regions; and (d) selecting all retained memory regions.

18. The data processing system of claim 15, wherein:
    the memory region retention metric is related to one of: (a) how many retained memory regions exist in the memory space; or (b) an amount of memory contained in retained memory regions in the memory space;
    when the memory region retention metric is the number of retained memory regions, the pre-determined threshold is a pre-determined integer number; and
    when the memory region retention metric is an amount of memory, the pre-determined threshold is a pre-determined measure of an amount of memory.

19. The data processing system of claim 15, wherein:
    the threshold is one of a user-definable or programmer-definable parameter to allow a compromise between memory performance and debugging ability; and
    the threshold is set to zero when maximum memory performance is desired to be achieved at run-time.

20. The data processing system of claim 15, wherein said designating takes place in response to a request to deallocate a memory region.

* * * * *